United States Patent

Zehnder

[11] 3,945,325
[45] Mar. 23, 1976

[54] RAILWAY BOGIE
[75] Inventor: Jürg Zehnder, Zurich, Switzerland
[73] Assignee: Swiss Aluminium Ltd., Chippis, Switzerland
[22] Filed: Sept. 16, 1974
[21] Appl. No.: 506,014

Related U.S. Application Data
[63] Continuation-in-part of Ser. No. 392,648, Aug. 29, 1973, which is a continuation of Ser. No. 149,924, June 4, 1971, abandoned.

[30] Foreign Application Priority Data
Sept. 20, 1973  Switzerland ................. 13545/73

[52] U.S. Cl. ............. 105/167; 105/182 R; 105/211; 105/218 A; 105/224 R; 267/3; 267/54 R
[51] Int. Cl.² ..... B61F 3/08; B61F 5/06; B61F 5/38; B61F 5/52
[58] Field of Search .... 105/182 R, 179, 211, 218 A, 105/218 R, 224 R, 167; 267/54 R, 3

[56] References Cited
UNITED STATES PATENTS
| | | | |
|---|---|---|---|
| 1,526,410 | 2/1925 | Aspinwall | 105/211 |
| 1,576,298 | 3/1926 | Barbey et al. | 105/179 |
| 2,098,459 | 11/1937 | McWhirter | 105/182 R |
| 2,242,422 | 5/1941 | Eksergian | 105/182 R |

FOREIGN PATENTS OR APPLICATIONS
668,027   7/1929   France .............. 267/54 R Primary Examiner—Robert J. Spar
Assistant Examiner—Howard Beltran
Attorney, Agent, or Firm—Ernest F. Marmorek

[57] ABSTRACT

A railway vehicle bogie comprising a main transverse beam and two axles each carrying a pair of wheels, each axle being linked to the beam by two radius arms, one on each side of the bogie, each radius arm being pivoted to the respective axle and to the beam in a manner permitting vertical and lateral swinging of each arm relative to the beam, and a leaf spring at each side of the bogie, each leaf spring being fixed at its center to the transverse beam and having each of its two ends linked to a respective radius arm by a respective unit, each unit comprising a wire cable which is secured to the radius arm and to the leaf spring, and abutments which are attached to the radius arm and which engage the cable between the radius arm and the leaf spring when the radius arm is swung laterally relatively to the transverse beam of the bogie.

4 Claims, 3 Drawing Figures

RAILWAY BOGIE

This is a continuation-in-part application of application Ser. No. 392,648, filed Aug. 29, 1973 which was a continuation application of application Ser. No. 149,924, filed June 4, 1971, now abandoned.

This invention relates to bogies for railway vehicles, especially for railway wagons, in which the pairs of wheels are guided by radius arms.

The U.S. application Ser. No. 392,648 describes a railway vehicle bogie comprising a main transverse beam and two axles each carrying a pair of wheels, each axle being linked to the beam by two radius arms, one on each side of the bogie, each radius arm being pivoted to the respective axle and to the beam, and a leaf spring at each side of the bogie, each leaf spring being fixed at its centre to the transverse beam and having each of its two ends linked to a respective radius arm by swinging links.

For the lateral springing of the radius arms, spring bars are provided which extend substantially parallel to the beam and are fixed near their ends to the radius arms. On lateral deflection of the radius arms, the spring bars exert a restoring force upon the wheel axles which is independent of the load in the wagon, while the swinging links exert a force which is dependent upon the load.

The present invention is based upon the problem of producing a bogie for railway vehicles, especially for railway wagons, with which the sudden loads which act laterally upon a bogie can be taken up better than hitherto.

According to this invention each end of a leaf spring is linked to a respectice radius arm not by swinging links but by a unit comprising a wire cable which is secured to the radius arm and to the leaf spring, and abutments which are attached to the radius arm and which engage the cable between the radius arm and the leaf spring when the radius arm is swung laterally relatively to the transverse beam of the bogie.

Preferably each wire cable is endless, and each free end of a leaf spring carries a transverse bolt on which are two pulleys which are embraced by the respective cable.

Preferably each unit comprises a cable guide element which is integral with two of the abutments, the integral element includes cable channels, and the abutments have curved surfaces for engaging the cable.

The accompanying drawing shows, in a simplified manner, a bogie embodying the invention. In these drawings.

Figure 1:
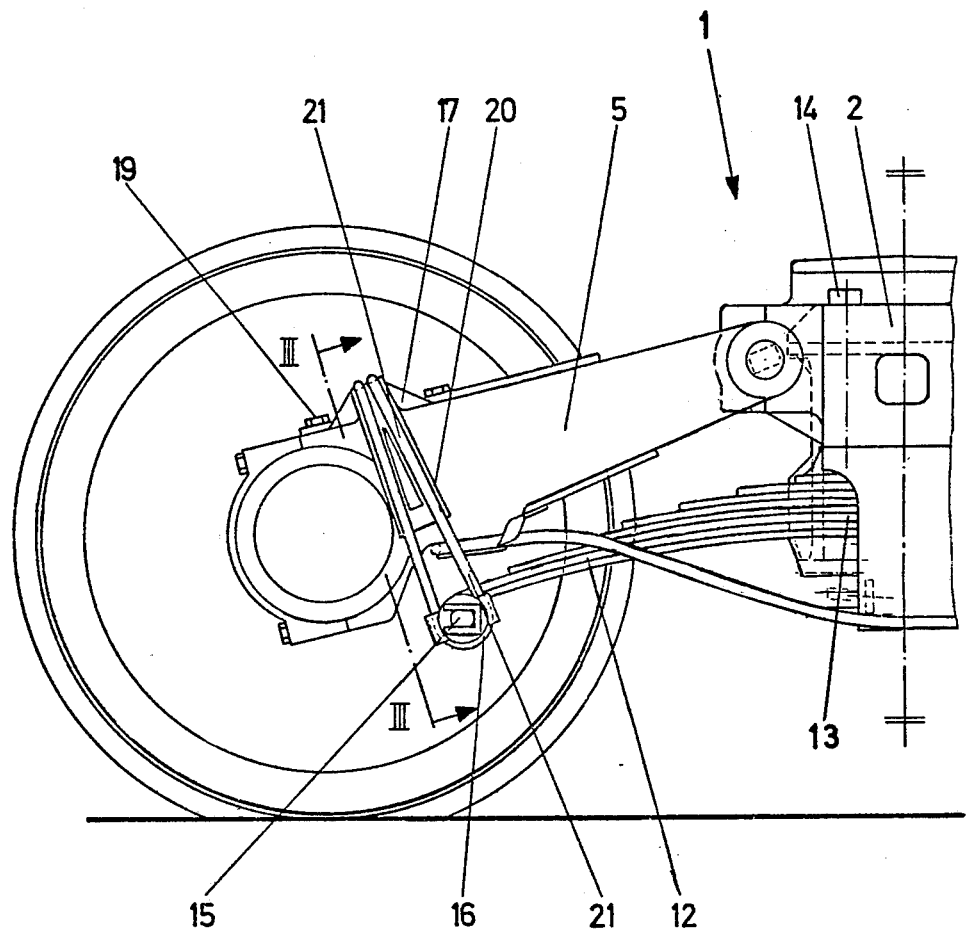
FIG. 1 is a partial side elevation.
Figure 2:
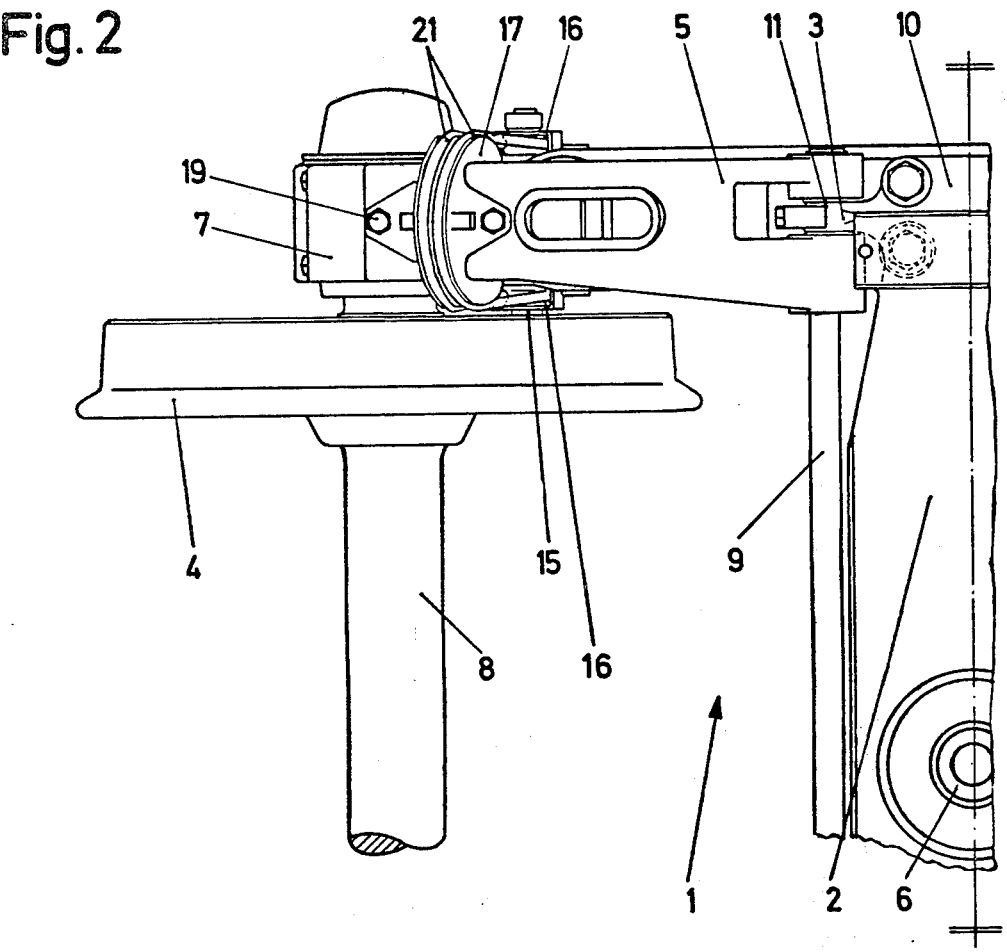
FIG. 2 is a partial plan.

As shown in FIGS. 1 and 2, the bogie 1 has a transverse beam 2 which is provided at its two ends with ball joints 3, on which radius arms 5 serving to receive pairs of track wheels 4 are pivotably mounted. The pivotal mounting is described in more detail in my U.S. application Ser. No. 392,648. A ball swivel socket 6 serving to receive and support the wagon superstructure is arranged on the transverse beam 2. At their free ends the radius arms 5 have self-aligning roller bearings 7 for the axles 8 of the wheel pairs 4.

The ends of the radius arms 5 adjacent to the beam 2 are of fork-shaped formation and connected with one another by a spring bar 9 of suitable cross-section with its ends fixed in the radius arms 5 and extending parallel with the transverse beam 2. This bar 9 serves at the same time for connecting the radius arms 5 with the ball joints 3. The spring bars 9 are bent elastically out of their normal position into as S-shape in plan under transverse impacts acting upon the wheels.

For the springing of the bogie 1 in the vertical direction there is a leaf spring 12 at each side. A clamp 13 at the centre of each spring is secured to the respective end of the transverse beam 2 by bolts 14.

Bolts 15 are inserted into eyes at the ends of the leaf spring 12. On each of the two ends of a bolt 15 protruding from a spring eye there is rotatably mounted a cable pulley 16. On the upper side of the radius arms 5 there is a cable guide element 17 of curved form with two parallel-extending cable channels 18. This element 17 is detachably secured by screws 19. On both sides of the cable guide element 17 there are provided cable holding means such as abutments 20 for an endless cable 21 which is looped into the cable channels 18 on the radius arm 5 and around the cable pulleys 16 on the end of the leaf spring 12, so that the end of the radius arm can swing to both sides in relation to the end of the leaf spring 12 within the range limited by the endless cable 21.

Figure 3:
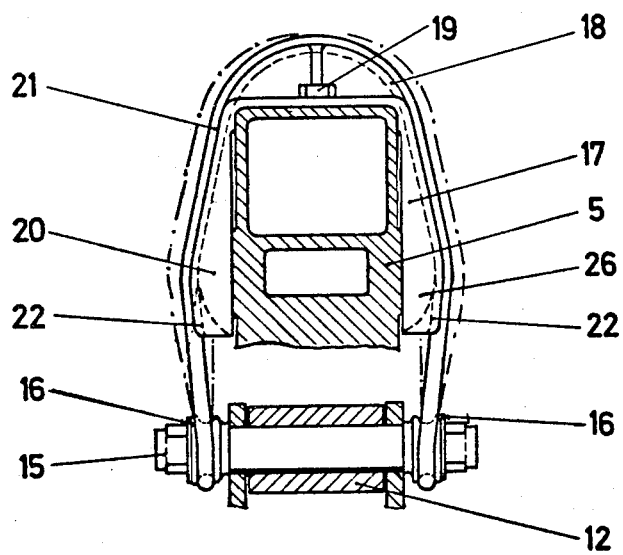
FIG. 3 is a section through a radius arm along the line III—III in FIG. 1.

The abutments 20 are integral with the cable guide element 17, and have curved surfaces 22 for engaging the cable 21, see also FIG. 3.

The distance between the contact of the cable 21 with the abutments 20 and with the cable pulleys 16 varies during lateral deflection of the radius arm 5. That is to say, this distance decreases on one side of the radius arm 5 while it increases on the other side thereof. The curved surfaces 22 can be shaped to give a desired progressive characteristic to the relationship between the lateral deflection and the horizontal component of force in the cable 21, which acts as a restoring force.

As a result of the decrease in the distance between the contact of the cable 21 with the abutments 20 and with the cable pulleys 16, the cable 21 between these contacts deviates increasingly from the vertical, which results in an increasingly progressive characteristic of the restoring force provided by the cable 21.

Thus the restoration of the radius arms 5 into the initial position is caused partly by the linking unit formed from the parts 16 to 22, which acts in proportion to the loading of the bogie, and partly by the spring bars 9 acting as flexure springs, which have substantially a linear characteristic.

The manner operation of the bogie as described above is as follows:

Whenever lateral impacts act upon the pairs of wheels, for example as a result of lateral deviation of the track from its normal position, or in the case of a sinusoidal course of the bogie, or on entry into bends, these impacts seek to vary the rectilinear direction of travel of the bogie and thus to cause displacement of the pairs of wheels transversely of the longitudinal direction of the bogie. For each wheel pair, the respective two radius arms 5 thereupon swing laterally about the ball joints 3, against the restoring forces acting progressively upon the cables 21 and the linearly acting restoring forces of the spring bar 9. This is rendered possible by the fact that the axles 8 of the wheel pairs 4 are mounted in the selfaligning roller bearings 7 on the ends of the radius arms 5.

With the aid of the linking units 16 to 22 having an increasingly progressive characteristic, it has now become possible to take up relatively great loads acting laterally upon the bogie, with small deflections.

The cable guide elements 17 are replaceable by other cable guide elements 17 adapted to a specific wagon type. The cable guide elements 17 adapted to the different wagon types differ from one another in the shape of the abutments 20 and in particular the different curve of the surfaces 22.

Due to the replaceability of the cable guide elements 17 it is possible to adjust the increasingly progressive characteristic of the linking units 16 to 22 in the desired manner. Replaceability is for example especially expedient if the bogie is to be assembled with a wagon superstructure of different weight. The formation of the linking units is not confined to the example as shown in FIGS. 1 to 3, since this merely represents one of several possible variants. In this connection it should also be pointed out that the abutments 20 with the curved surfaces 22 can be made separately from the cable guide element 17, and can be secured detachably to the radius arms 5.

With the aid of the invention it has now become possible with relatively simple means to take up lateral impacts acting upon the radius arms 5 better than hitherto over the entire range of travel of the radius arms 5. Furthermore the possibility of exchanging abutments 20 of different formations and adapted to the different wagon types with one another if desired is advantageous.

What I claim is:

1. A railway vehicle bogie comprising
   a main transverse beam and
   two axles each carrying a pair of wheels,
   each axle being linked to the beam by two radius arms, one on each side of the bogie,
   each radius arm being pivoted to the respective axle and to the beam in a manner permitting vertical and lateral swinging of each arm relative to the beam and including cable holding means secured thereto, and
   a leaf spring at each side of the bogie, each leaf spring being fixed at its center to the transverse beam and having each of its two ends linked to a respective radius arm by a respective unit,
   each unit comprising a flexible, unextendable cable which is secured to the radius arm and to the leaf spring,
   said cable holding means engaging the cable.

2. A bogie according to claim 1, in which each cable is endless.

3. A bogie according to claim 2, in which each end of the leaf spring carries a transvere bolt on which are two pulleys, the respective cable engaging each pulley and said cable holding means.

4. A bogie according to claim 1, in which said cable holding means have curved bearing parts defined therein to receive said cable.

* * * * *